(12) United States Patent
Kujawski, Jr. et al.

(10) Patent No.: US 9,810,339 B2
(45) Date of Patent: Nov. 7, 2017

(54) SINGLE AXIS THERMAL RELIEF VALVE

(71) Applicant: Oetiker NY, Inc., Lancaster, NY (US)

(72) Inventors: James Anthony Kujawski, Jr., Attica, NY (US); Nicholas Harvey Ihle, Tonawanda, NY (US)

(73) Assignee: Oetiker NY, Inc., Lancaster, NY (US)

( * ) Notice: Subject to any disclaimer, the term of this patent is extended or adjusted under 35 U.S.C. 154(b) by 423 days.

(21) Appl. No.: 14/618,090

(22) Filed: Feb. 10, 2015

(65) Prior Publication Data
US 2016/0230901 A1    Aug. 11, 2016

(51) Int. Cl.
| F01P 7/02 | (2006.01) |
| G05D 23/13 | (2006.01) |
| G05D 23/12 | (2006.01) |
| F01P 7/14 | (2006.01) |
| F16K 31/00 | (2006.01) |
| G05D 23/02 | (2006.01) |

(52) U.S. Cl.
CPC ......... *F16K 31/002* (2013.01); *G05D 23/022* (2013.01)

(58) Field of Classification Search
CPC .. F01M 5/007; F01P 11/08; F16H 2061/0037; F16H 57/0413
USPC ................... 236/34.5, 93 A, 93 R; 237/12 R
See application file for complete search history.

(56) References Cited

U.S. PATENT DOCUMENTS

| 3,822,563 | A | * | 7/1974 | Orth | F25B 41/043 236/92 B |
| 3,841,551 | A |  | 10/1974 | Ota | |
| 4,215,816 | A | * | 8/1980 | Lord | G05B 9/05 116/216 |
| 4,453,668 | A | * | 6/1984 | Abel | F01P 11/16 236/100 |
| 4,460,007 | A | * | 7/1984 | Pirkle | F16K 17/38 137/62 |
| 5,361,980 | A | * | 11/1994 | Stout | F01P 11/16 137/72 |
| 5,791,557 | A |  | 8/1998 | Kunze | |
| 5,992,755 | A |  | 11/1999 | Kuze | |
| 7,823,289 | B2 |  | 11/2010 | Willers et al. | |

(Continued)

FOREIGN PATENT DOCUMENTS

| JP | 10288037 A | 10/1998 |
| JP | 2006266660 A | 10/2006 |

*Primary Examiner* — Henry Crenshaw
(74) *Attorney, Agent, or Firm* — Simpson & Simpson, PLLC (57) ABSTRACT

A thermal relief valve, comprising a housing having a channel, a first aperture, and a second aperture, wherein the first aperture and the second aperture are arranged symmetrically about a central axis, an actuator within the housing arranged about the axis, a first seal secured to the actuator, the first seal comprising a plurality of apertures, and having a first upwardly facing surface, and a second downwardly facing surface, a first spring arranged between the second surface of the first seal and the housing component, a second seal comprising a first upwardly facing surface and a second downwardly facing surface, the first surface of the second seal positioned on the second surface of the first seal and, a second spring arranged between the second surface of the second seal and the housing, wherein the first seal and the second seal are axially movable by the actuator along the central axis.

20 Claims, 13 Drawing Sheets

(56) References Cited

U.S. PATENT DOCUMENTS

| | | | |
|---|---|---|---|
| 8,066,197 B2 * | 11/2011 | Sheppard | F01P 7/16 123/41.09 |
| 8,123,143 B2 | 2/2012 | Willers et al. | |
| 8,141,790 B2 | 3/2012 | Sheppard | |
| 8,490,885 B2 | 7/2013 | Lamb et al. | |
| 8,978,992 B2 * | 3/2015 | Zillig | F15B 21/042 137/468 |
| 9,109,822 B2 * | 8/2015 | Liu | F25B 41/062 |
| 2003/0136855 A1 | 7/2003 | Brown | |
| 2004/0226613 A1 | 11/2004 | Ono | |
| 2006/0107673 A1 | 5/2006 | Hirota | |
| 2007/0290058 A1 * | 12/2007 | Guterman | E03C 1/041 236/93 R |
| 2008/0223316 A1 * | 9/2008 | Banta | G05D 23/022 123/41.1 |
| 2009/0025922 A1 | 1/2009 | Strzelczyk et al. | |
| 2010/0126594 A1 * | 5/2010 | Sheppard | F01P 7/16 137/340 |
| 2010/0200783 A1 | 8/2010 | Lamb et al. | |
| 2010/0224258 A1 | 9/2010 | Steveley et al. | |
| 2010/0224267 A1 | 9/2010 | Flomenblit et al. | |
| 2011/0061744 A1 | 3/2011 | Zillig et al. | |
| 2012/0247582 A1 * | 10/2012 | Lamb | F16K 11/044 137/468 |
| 2013/0015376 A1 * | 1/2013 | Kocurek | F16K 31/002 251/11 |
| 2014/0000727 A1 | 1/2014 | Fisher et al. | |

* cited by examiner

SINGLE AXIS THERMAL RELIEF VALVE

FIELD OF THE INVENTION

The invention relates generally to a thermal relief valve, and more specifically, to a thermal relief valve with both a pressure relief seal and a thermal relief seal arranged about a single, central axis.

BACKGROUND OF THE INVENTION

Thermal relief valves are used in various applications which involve transporting fluid from a transmission to a heat exchanger in an automobile. In most applications, it is beneficial to have the fluid warm so that it can flow easier through tubes and components. In order to warm the fluid in a timely manner, a thermal relief valve is used to bypass the heat exchanger until an optimal operating temperature can be reached. Once this optimal temperature is reached, the thermal relief valve then allows the fluid to flow through the heat exchanger instead of bypassing it.

Available space in an engine bay and underneath an automobile can be limited, so it is important that any additional components such as a thermal relief valve take up as little space as possible. Additionally, the efficiency an automobile achieves is related to the weight of the car, so a thermal relief valve should also be as lightweight as possible while still acting as a bypass to the heat exchanger.

Since a thermal relief valve forces fluid to bypass a heat exchanger, the thermal relief valve must have a pressure release in order to prevent a blockage of the fluid. Since the fluid is responsible for the cooling of major components, such as the transmission, a blockage in the thermal relief valve would prevent any fluid from reaching the heat exchanger and would cause components to overheat while in operation causing extensive damage to the automobile.

A possible solution to this problem is disclosed in United States Patent Application Publication No. U.S. 2011/0061744 (Zillig et al.). Zillig et al. disclose a cooler bypass valve apparatus installed between a heat exchanger and conduits coupled to a device carrying fluid that needs to be cooled such as a radiator and transmission. A housing includes an inlet port and first and second outlet ports. At least one thermal actuator and at least one valve are mounted in a fluid flow passageway in the housing and actuate in response to the temperature of the fluid flowing within the apparatus. One valve that is arranged between an opened and closed position allows fluid to flow from the inlet port through the first and second outlet ports between a heat exchanger bypass loop and a heat exchanger cooling loop. In order to bypass the heat exchanger, sufficient pressure must be present within the system. Additionally, there are two thermal actuators which are arranged between the first and second outlets and actuate between opened and closed positions enabling fluid to only flow from the inlet port and through both the first and second outlet ports separately or in combination. Unfortunately, Zillig et al. fail to disclose an apparatus which bypasses the heat exchanger without any regard for the pressure within the system and also bypasses the heat exchanger completely instead of regulating the amount of fluid passing through the apparatus. Additionally, Zillig et al. fail to disclose an apparatus which includes a means for pressure relief which is axially arranged within the apparatus.

Another possible solution to this problem is disclosed in U.S. Pat. No. 8,141,790 (Sheppard). Sheppard discloses a bypass valve for a heat exchanger which allows fluid to flow through the heat exchanger at a certain operating temperature. A thermally sensitive actuator is mounted in the apparatus and can extend or retract depending on the temperature of the fluid flowing around the actuator. Once an optimal operating temperature has been reached, a bypass valve seat is arranged in a housing along with a bypass valve member which is movable by the actuator into an opened or closed position forcing the fluid to travel through the heat exchanger. A relief valve is mounted in the apparatus and has a relief valve member in order to close or open pressure relief ports. This relief valve member is biased towards the closed position to prevent excessive fluid from passing through the apparatus. Excessive pressure build up in the system would cause the relief valve member to move to an open position and allow fluid to flow through the apparatus. If the apparatus is not at an optimal operating temperature, the bypass valve member is not in a closed position which would allow fluid to flow freely through the apparatus without the need for the relief valve member. Unfortunately, Sheppard fails to disclose an apparatus which has the least amount of ports possible in order to save on weight and operating space. Additionally, Sheppard fails to disclose an apparatus which relieves the excessive pressure within the system while also guaranteeing fluid to flow through the heat exchanger and also fails to disclose a pressure relief means axially arranged within the apparatus.

Thus, there has been a long-felt need for a thermal relief valve that is both lightweight and compact while also comprising a pressure relief means axially arranged with a thermal relief means within the body of the apparatus.

BRIEF SUMMARY OF THE INVENTION

The present invention broadly comprises a thermal relief valve, comprising a housing having a channel, a first aperture, and a second aperture, wherein the first aperture and the second aperture are arranged symmetrically about a central axis, an actuator within the housing arranged about the axis, a first seal secured to the actuator, the first seal comprising a plurality of apertures, and having a first upwardly facing surface, and a second downwardly facing surface, a first spring arranged between the second surface of the first seal and the housing component, a second seal comprising a first upwardly facing surface and a second downwardly facing surface, the first surface of the second seal positioned on the second surface of the first seal and, a second spring arranged between the second surface of the second seal and the housing, wherein the first seal and the second seal are axially movable by the actuator along the central axis.

Additionally, the present invention comprises a seal assembly of a thermal relief valve, the thermal relief valve comprising a housing, an actuator within the housing, a first spring arranged within the housing, and a second spring arranged within the housing, the seal assembly comprising a first seal secured to the actuator, the first seal comprising a plurality of apertures, and having a first upwardly facing surface, and a second downwardly facing surface and, a second seal comprising a first upwardly facing surface and a second downwardly facing surface, the first surface of the second seal positioned on the second surface of the first seal, wherein the first spring biases the first seal along the second surface of the first seal and the second spring biases the second seal along the second surface of the second seal.

Additionally, the present invention comprises a thermal relief valve, comprising a housing having at least one channel, a first aperture, and a second aperture, wherein the first aperture and the second aperture are arranged symmetrically about a central axis, an actuator within the housing arranged about the central axis housing, a first seal secured to the actuator, the first seal comprising a plurality of apertures, and having a first upwardly facing surface, and a second downwardly facing surface, a first spring arranged between the second surface of the first seal and the housing component, a second seal comprising a first upwardly facing surface and a second downwardly facing surface, the first surface of the second seal positioned on the second surface of the first seal and, a second spring arranged between the second surface of the second seal and the housing, wherein when the thermal relief valve is in a first configuration the first surface of the first seal engages the housing and the first surface of the second seal engages the second surface of the first seal, when the thermal relief valve is in a second configuration the actuator is axially displaced, the first surface of the first seal does not engage the housing, and the first surface of the second seal engages the second surface of the first seal, and when the thermal relief valve is in a third configuration the first surface of the second seal does not engage with the second surface of the first seal.

A primary object of the invention is to provide a thermal relief valve which is compact, arranges all components on a central axis, and restricts fluid that is being transported to a heat exchanger in order to reach an optimal operating temperature while also having a pressure relief means and a thermal relief means.

These and other objects, features and advantages of the present invention will become readily apparent upon a review of the following detailed description of the invention, in view of the drawings and appended claims.

BRIEF DESCRIPTION OF THE DRAWINGS

The nature and mode of operation of the present invention will now be more fully described in the following detailed description of the invention taken with the accompanying figures, in which.

DETAILED DESCRIPTION OF THE INVENTION

At the outset, it should be appreciated that like drawing numbers on different drawing views identify identical, or functionally similar, structural elements of the invention. It is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention.

Unless defined otherwise, all technical and scientific terms used herein have the same meaning as commonly understood to one of ordinary skill in the art to which this invention pertains. It should be understood that any methods, devices or materials similar or equivalent to those described herein can be used in the practice or testing of the invention. The assembly of the present invention could be driven by hydraulics, electronics, and/or pneumatics.

Figure 1:
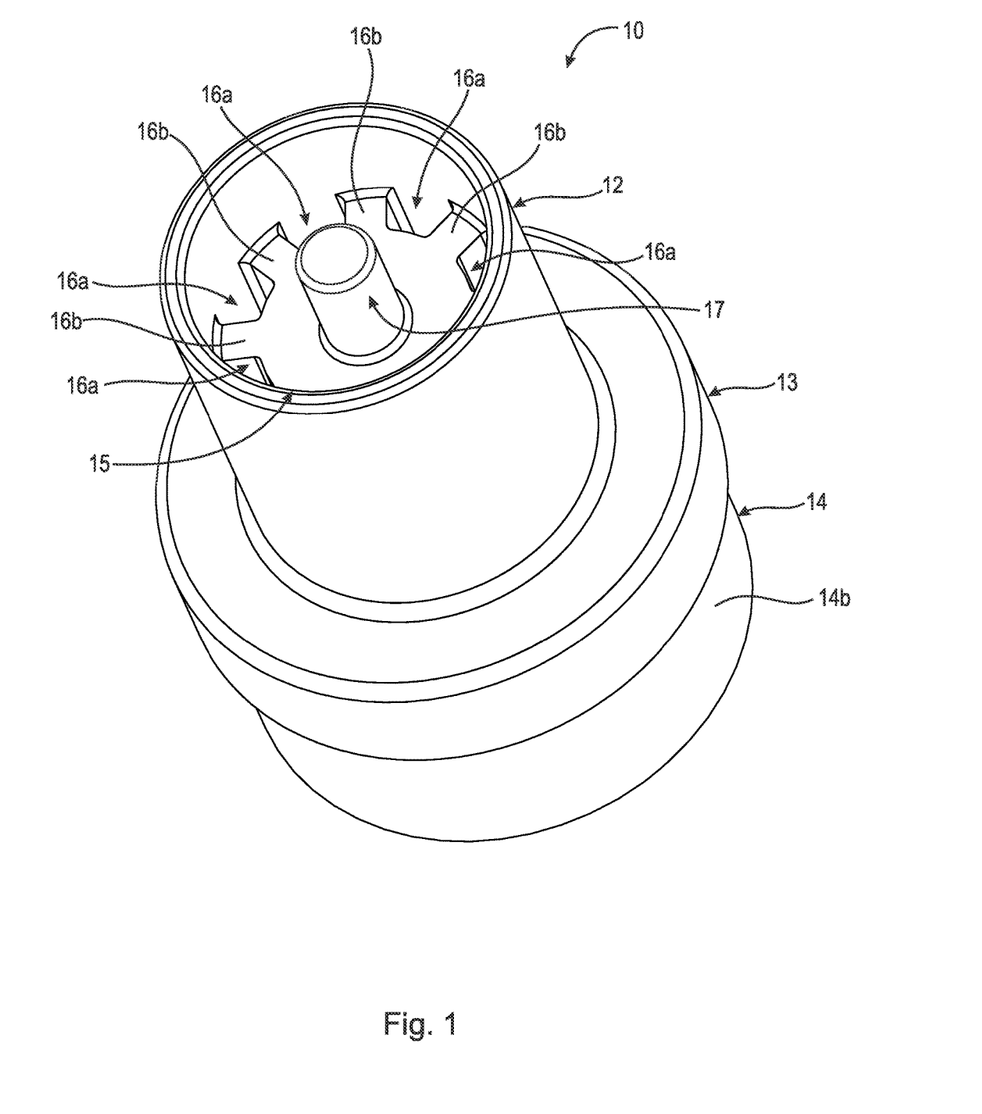
FIG. 1 is a top perspective view of thermal relief valve 10 of the present invention.

Adverting now to the figures, FIG. 1 is a top perspective view of thermal relief valve 10 of the present invention. Thermal relief valve 10 broadly comprises first housing component 12 and second housing component 14. First housing component 12 comprises rim 13, aperture 15, guides 16b, and channels 16a which allow fluid (not shown) to flow into thermal relief valve 10. Cylindrical enclosure 17 houses pin 34 (shown in FIG. 11) and is integral to first housing component 12. Rim 13 is integral with first housing component 12 and secures second housing component 14 to first housing component 12. In a preferred embodiment, rim 13 has a larger radius than first housing component 12 and second housing component 14. It should be appreciated, however, that the use of different radii is possible and considered to be within the scope of the invention as claimed. For example, first housing component 12 could have a larger radius than rim 13. First housing component 12 is secured to second housing component 14 along surface 14b and surface 13a via a press fit (shown in FIG. 11). Other securement means are possible such as screwing first housing component 12 and second housing component 14 together or using a permanent seal such as epoxy or welding. Additionally, first housing component 12 and second housing component 14 could be manufactured as a single component. If first housing component 12 and second housing component 14 were integral with one another, internal components such as thermal relief seal 10, pressure relief seal 30, thermal actuator 36, seal assembly 23, spring 22, and spring 24 could be arranged within the housing by an externally threaded screw plate engaged with internal threads on the housing (not shown) or the housing could be formed to secure all the components within the housing.

Figure 2:
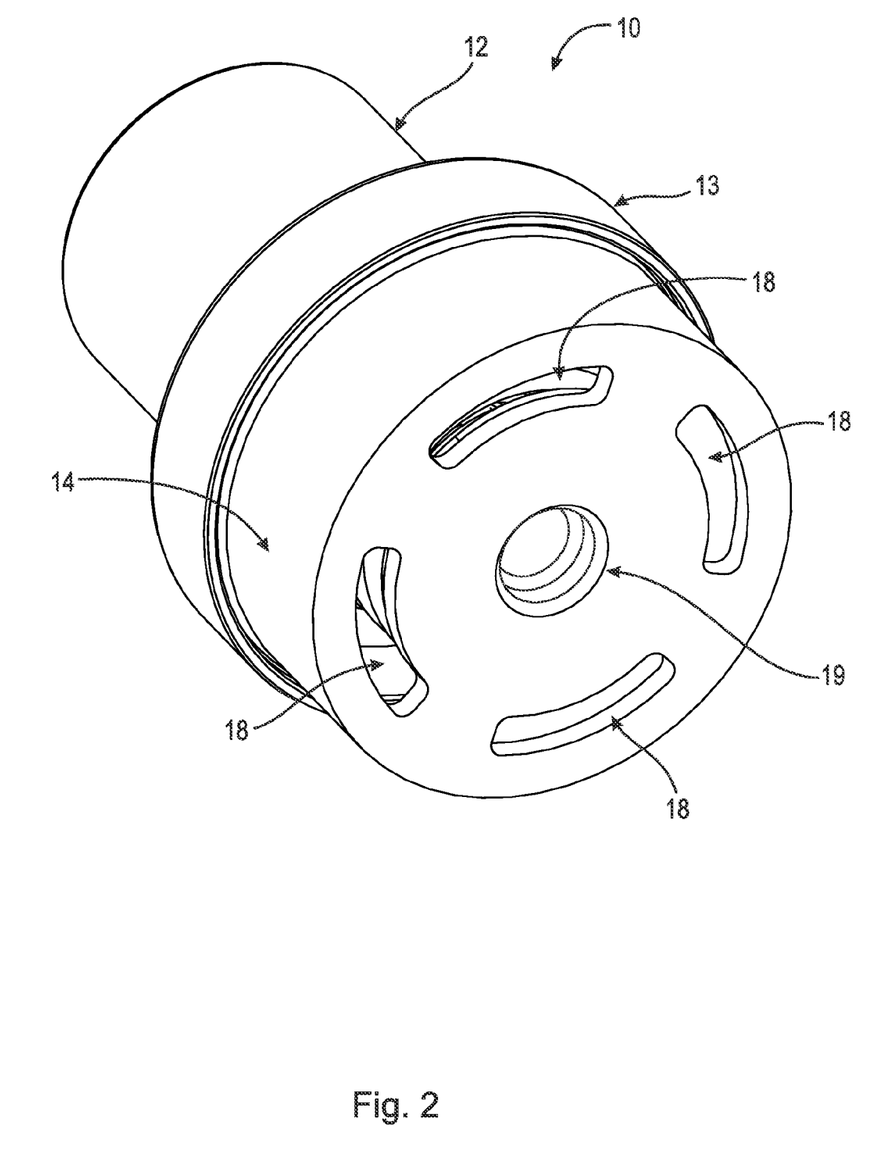
FIG. 2 is a bottom perspective view of thermal relief valve 10.

FIG. 2 is a bottom perspective view of thermal relief valve 10. Second housing component 14 is concentrically arranged within rim 13 of first housing component 12. Apertures 18 are arranged in a symmetrical pattern centered on central axis 40 (shown in FIG. 11) of thermal relief valve 10 on the bottom of second housing component 14. Recess 19 is arranged in the center of second housing component 14 and secures spring 22 and spring 24 within first housing component 12 and second housing component 14 (shown in FIG. 11). In a preferred embodiment, first housing component 12 and second housing component 14 are manufactured from nylon. It should be appreciated, however, that the use of different materials is possible and considered to be within the scope of the invention as claimed. For example, first housing component 12 and second housing component 14 could be manufactured from a durable but lightweight material such as aluminum.

Figure 3:
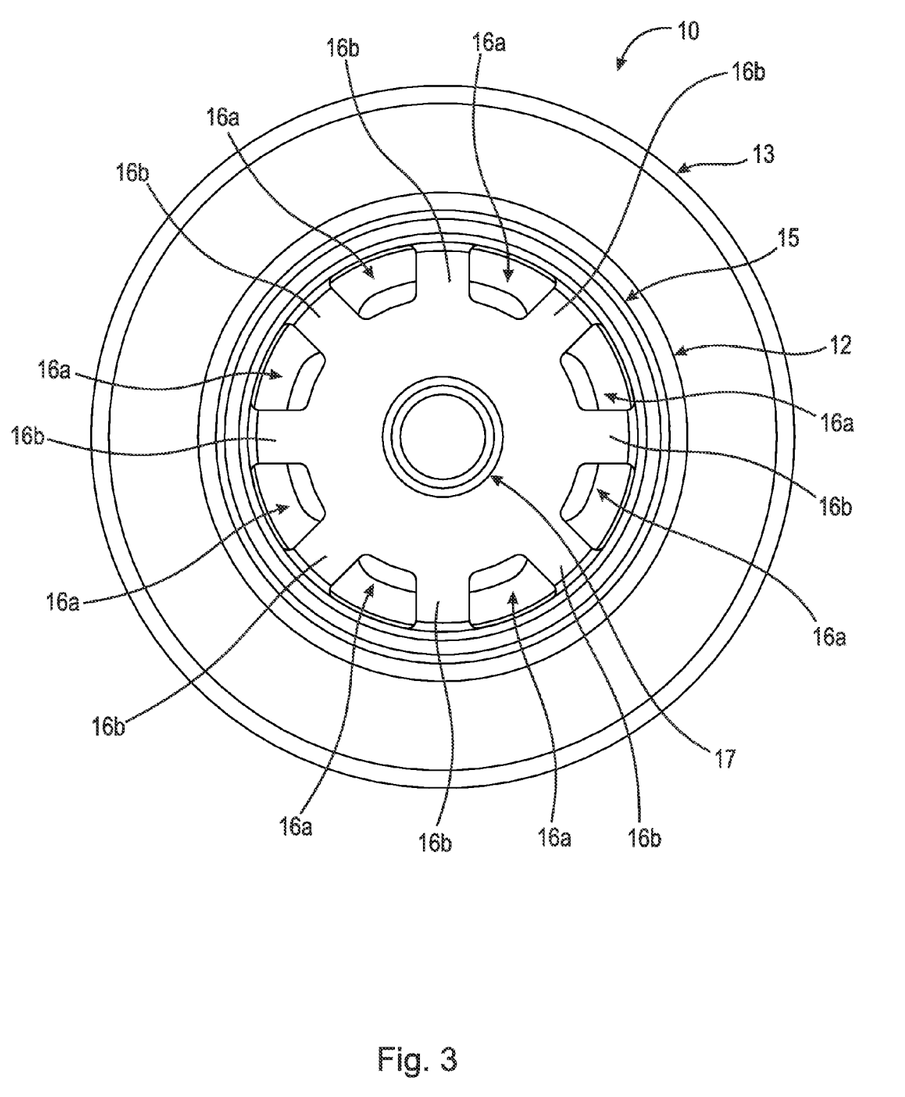
FIG. 3 is a top view of thermal relief valve 10.
Figure 4:
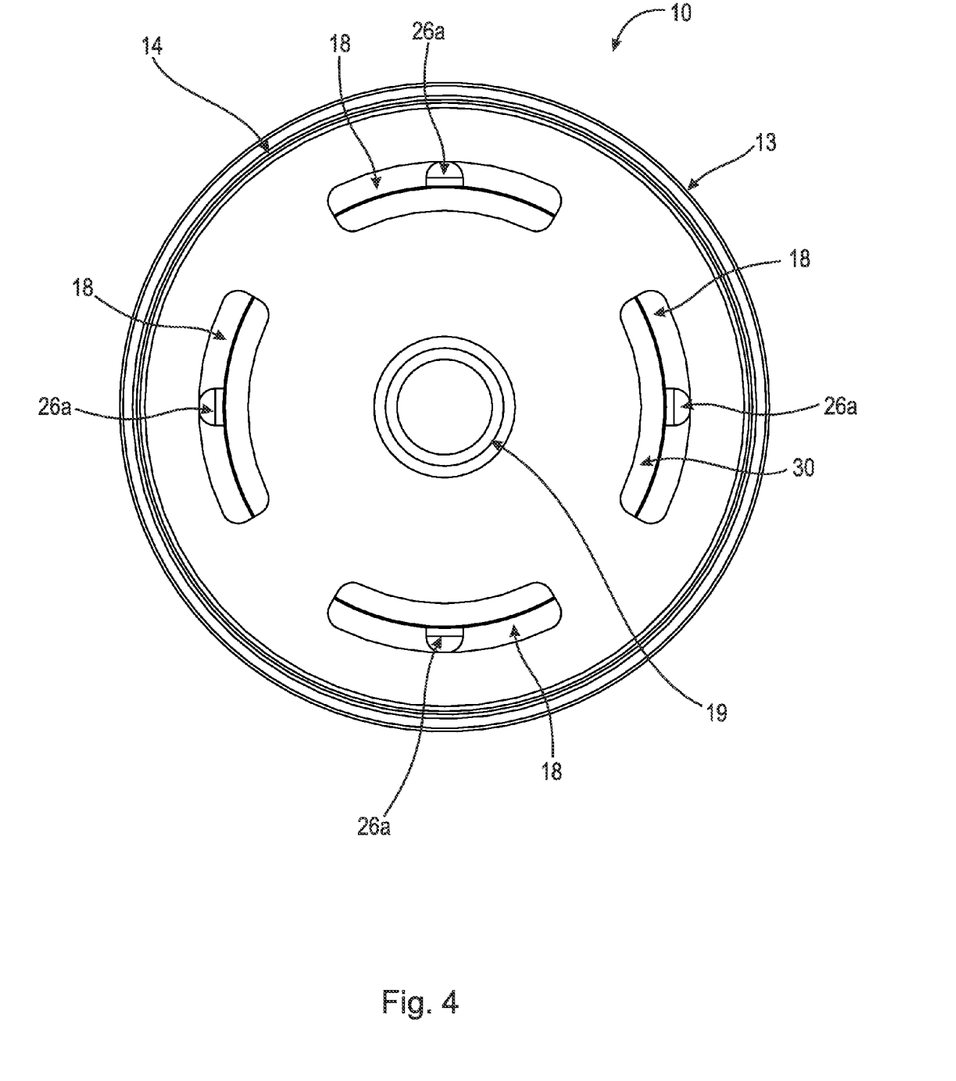
FIG. 4 is a bottom view of thermal relief valve 10.
Figure 5:
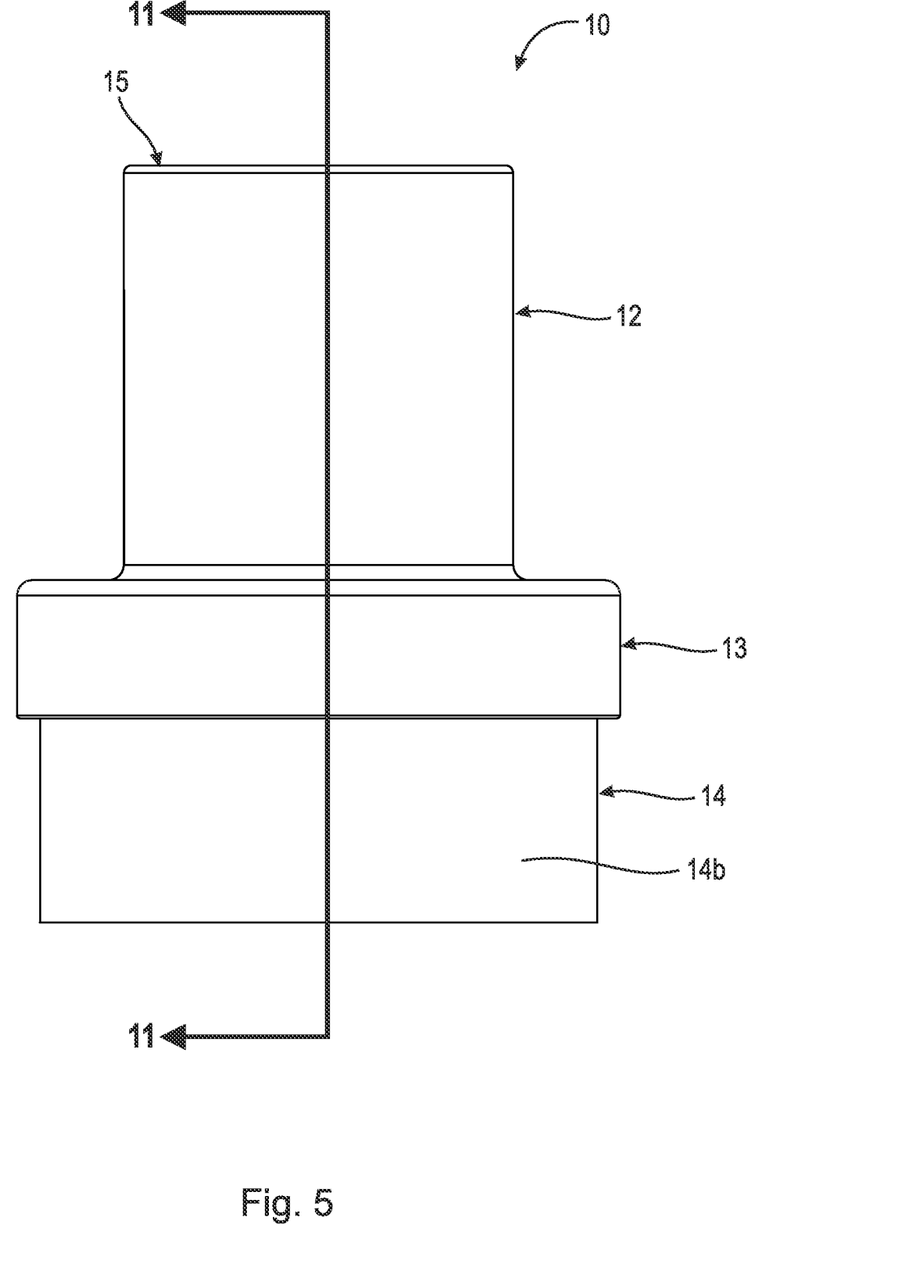
FIG. 5 is a side view of thermal relief valve 10.

FIG. 3, FIG. 4, and FIG. 5 are a top view, bottom view, and side view of thermal relief valve 10, respectively. As shown in the figures, channels 16a and guides 16b are arranged in a symmetrical pattern about cylindrical enclosure 17. Guides 16b guide thermal actuator 36 (shown in FIG. 11) during linear displacement of thermal relief seal 25. Channels 26a are integral with first housing component 12 and allow fluid (not shown) to flow through thermal relief valve 10 when thermal relief seal 25 is not linearly displaced by thermal actuator 36 (shown in FIG. 11).

Figure 6:
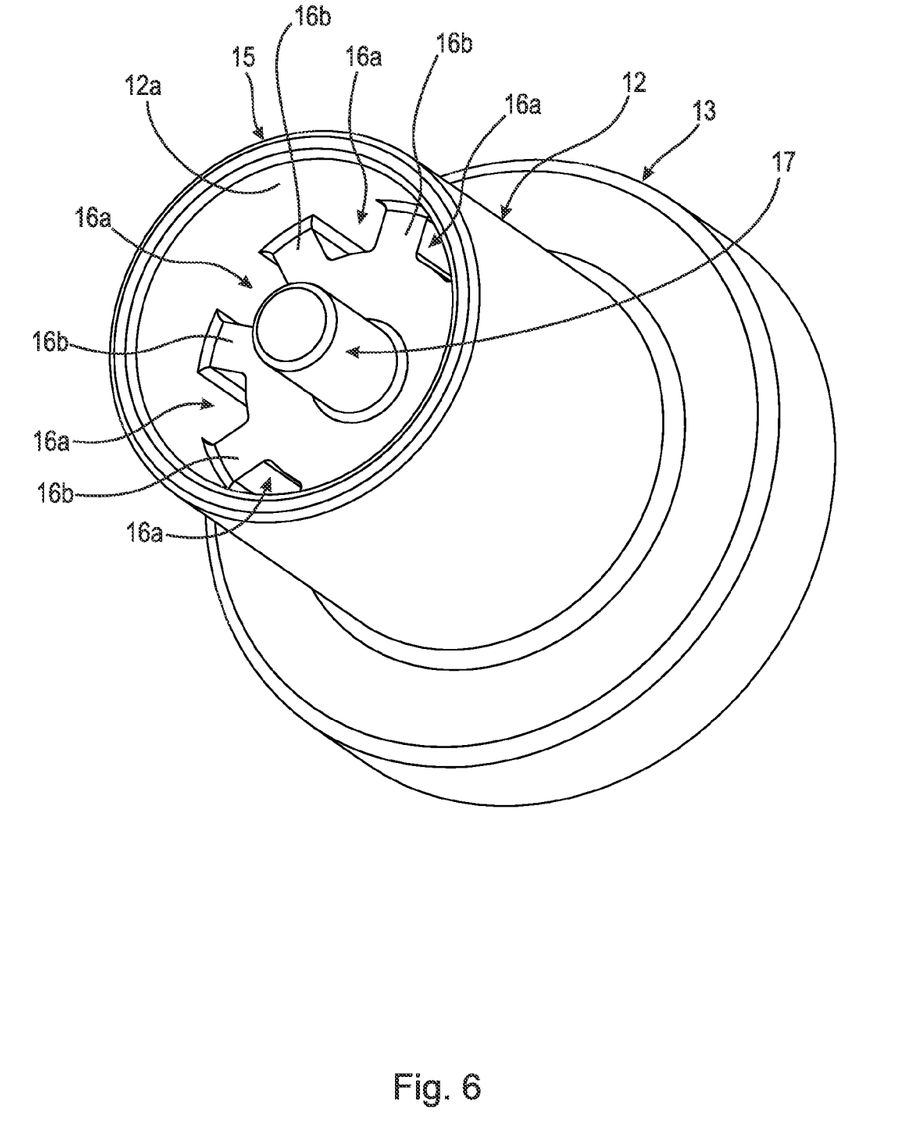
FIG. 6 is a top perspective view of first housing component 12.
Figure 7:
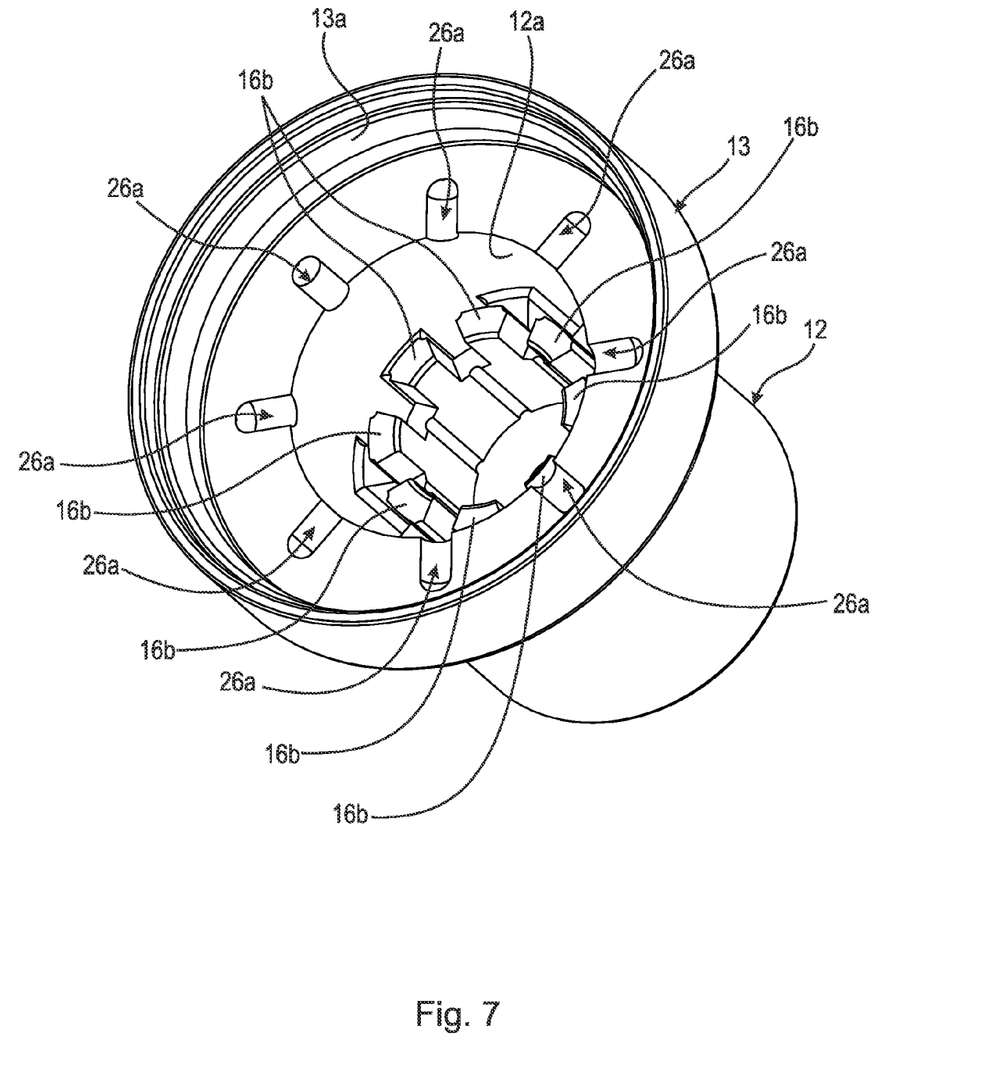
FIG. 7 is a bottom perspective view of first housing component 12.

FIG. 6 and FIG. 7 are a top perspective view and bottom perspective view of first housing component 12, respectively. As shown in the figures, channels 26a are arranged symmetrically about central axis 40 (shown in FIG. 11). It is important to note that channels 26a extend radially outward greater than the radial distance of thermal relief seal 25. When thermal actuator 36 is not thermally expanded linearly, upwardly facing surface 25a of thermal relief seal 25 engages surface 12a of first housing component 12 (shown in FIG. 11). When thermal relief seal 25 is not linearly displaced and engaged with surface 12a of first housing component 12, fluid can only pass through thermal relief valve 10 via channels 26a unless there is excessive pressure build up. In the case of excessive pressure build up, fluid could flow through pressure relief apertures 26b of thermal relief seal 25 (shown in FIG. 10). Additionally, guides 16b extend linearly within first housing component 12 to guide thermal actuator 36. In a preferred embodiment, channels 26a are arranged symmetrically within first housing component 12. It should be appreciated, however, that the use of different arrangements and positions of channels 26a is possible and considered to be within the scope of the present invention as claimed. For example, channels 26a could be channels or apertures arranged on thermal relief seal 25 (shown in FIG. 10) to allow fluid to flow through thermal relief valve 10 when thermal relief seal 25 is not linearly displaced.

Figure 8:
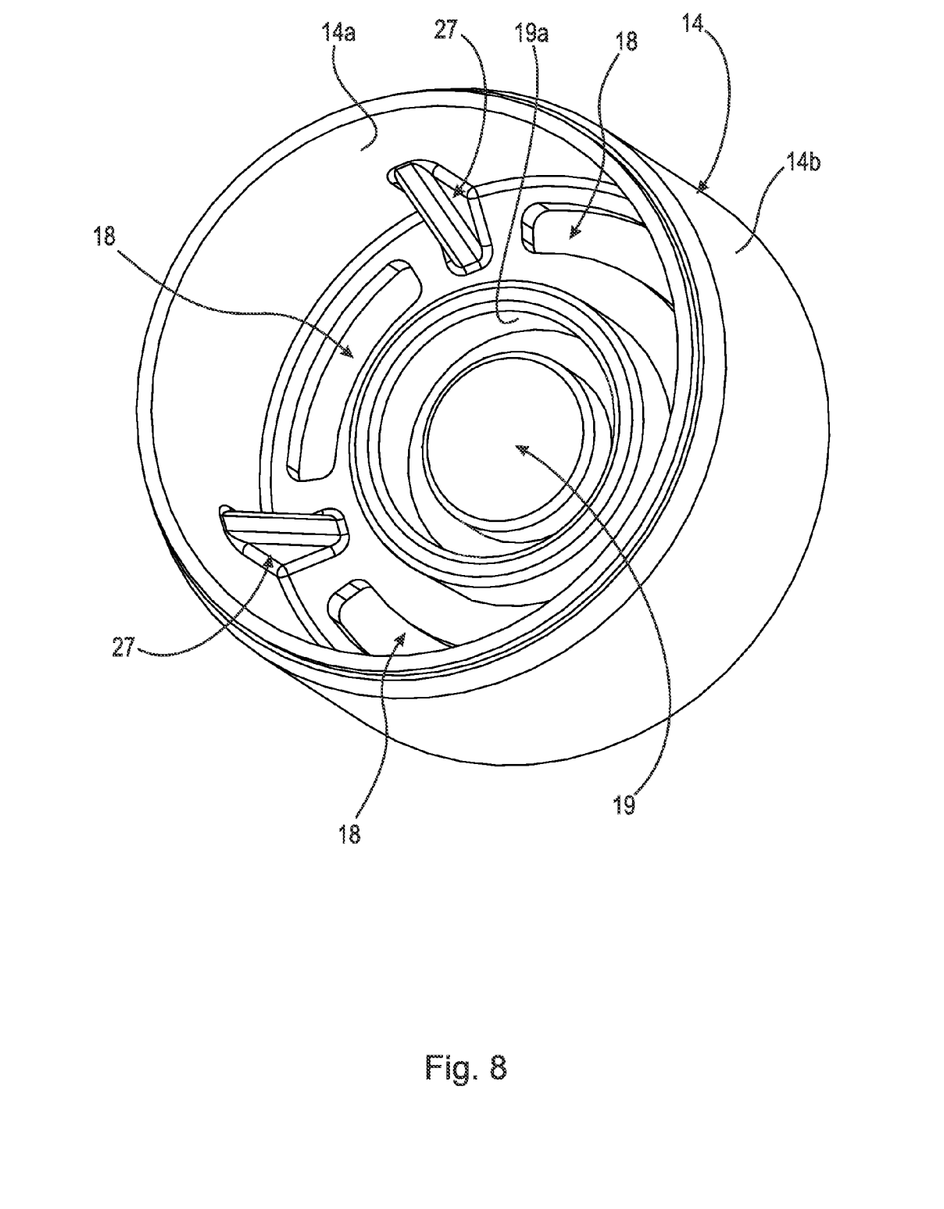
FIG. 8 is a top perspective view of second housing component 14.
Figure 9:
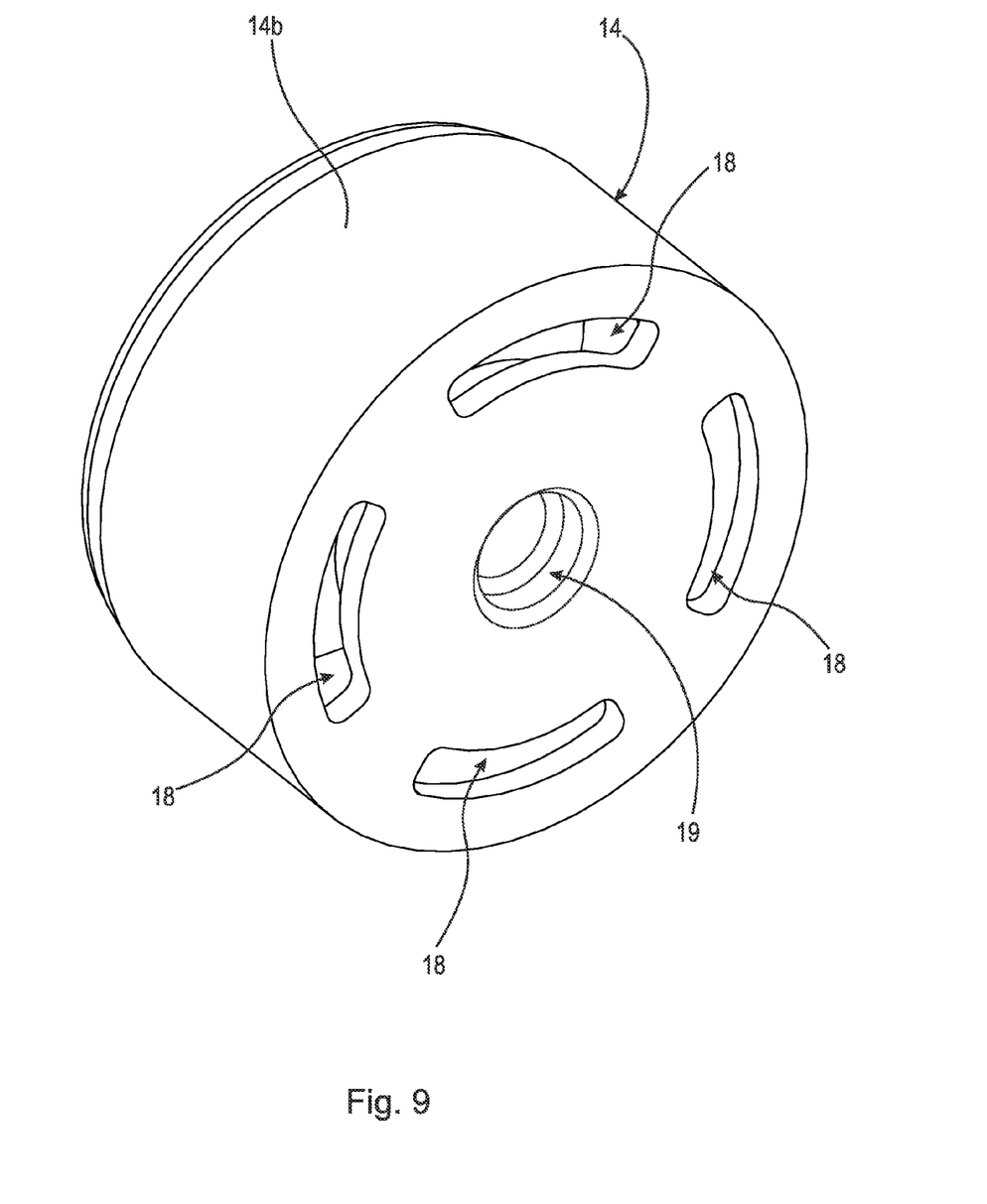
FIG. 9 is a bottom perspective view of second housing component 14.

FIG. 8 and FIG. 9 are top and bottom perspective view of second housing component 14, respectively. Second housing component 14 comprises apertures 18, recess 19, and supports 27. Recess 19 is axially arranged on second housing component 14 and engages spring 22 and spring 24 along surface 19a (shown in FIG. 11). Supports 27 are symmetrically arranged on surface 14a of second housing component 14. Supports 27 reinforce second housing component 14 when spring 22 and spring 24 engage recess 19 (shown in FIG. 11). In a preferred embodiment, apertures 18 are symmetrically arranged about recess 19. It should be appreciated, however, that the use of different arrangements are possible and considered to be within the scope of the present invention as claimed. For example, apertures 18 could be combined into a single aperture positioned within recess 19 to allow fluid to pass through thermal relief valve 10 or apertures 18 could be asymmetrical. Both recess 19 and supports 27 are integral with second housing component 14.

Figure 10:
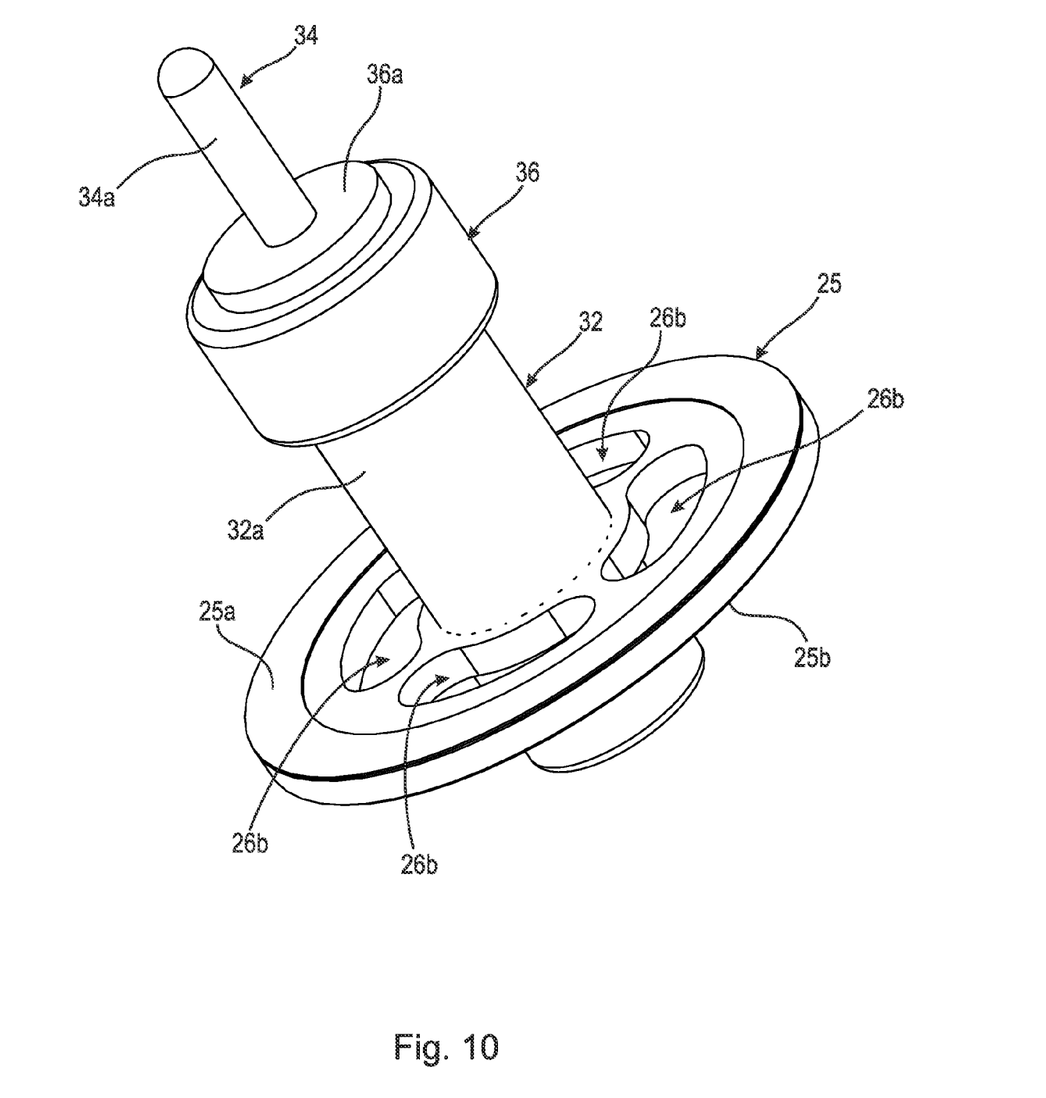
FIG. 10 is a perspective view of thermal actuator 36 and thermal relief seal 25.

FIG. 10 is a perspective view of thermal actuator 36 and thermal relief seal 25. Thermal actuator 36 broadly comprises pin 34 and body 32. Pin 34 is concentrically arranged within body 32 and can be linear displaced within body 32. Additionally, thermal relief seal 25 is secured to surface 32a of body 32. Thermal relief seal 32 can be integral with body 32 or permanently secured via a press fit or epoxy. Arranged within thermal actuator 36 is an expandable medium (not shown). In a preferred embodiment, the expandable medium is a wax element which melts when thermal actuator 36 reaches a specific operating temperature. It should be appreciated, however, that the use of different expandable mediums is possible and should be considered within the scope of the invention as claimed. Surface 36a of thermal actuator 36 engages surface 12a of first housing component 12 and surface 34a of pin 34 engages surface 17a of cylindrical enclosure 17 (shown in FIG. 11). Pressure relief apertures 26b are symmetrically arranged about body 32 of thermal actuator 36. In a preferred embodiment, thermal relief seal 25 and pressure relief seal 30 are washers axially arranged on body 32 of thermal actuator 36. Other types and shapes of seals can be used depending on the operating constraints.

Figure 11:
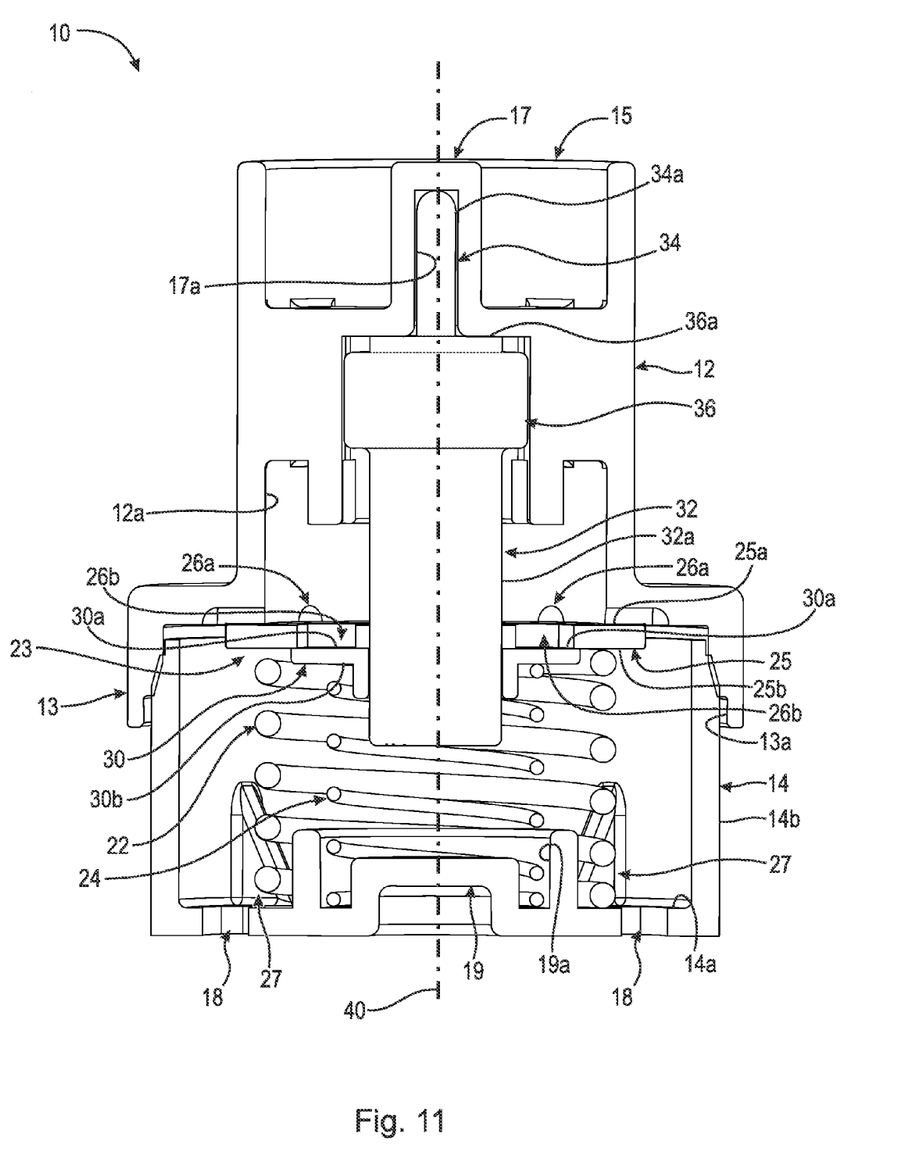
FIG. 11 is a cross-sectional view of thermal relief valve 10 in a first configuration taken generally along line 11-11 shown in FIG. 5.

FIG. 11 is a cross-sectional view of thermal relief valve 10 in a first configuration taken generally along line 11-11 shown in FIG. 5. As shown in the figure, thermal actuator 36, seal assembly 23, spring 22, and spring 24 are axially arranged about centerline 40. Seal assembly 23 comprises thermal relief seal 25 and pressure relief seal 30. Thermal relief seal 25 is held in place against surface 12a of first housing component 12 by spring 22 and directs fluid through channels 26a. Additionally, pressure relief seal 30 is axially arranged about body 32 of thermal actuator 36 and held in place against downwardly facing surface 25b of pressure relief seal 25 by spring 24. Spring 22 engages downwardly facing surface 25b of thermal relief seal 25 and surface 14a of second housing component 14. Spring 24 engages downwardly facing surface 30b of pressure relief seal 30 and surface 19a of recess 19. Spring 22 and spring 24 provide resistance to fluid (not shown) flowing through thermal relief valve 10. Since thermal relief seal 25 and pressure relief seal 30 have independent springs, both thermal relief seal 25 and pressure relief seal 30 can be linearly displaced independently of one another. In a preferred embodiment, spring 22 has a greater stiffness value than spring 24 since spring 22 is compressed by pin 34 linearly expanding and engaging surface 17a while spring 24 is compressed by the force the fluid (not shown) imparts on upwardly facing surface 30a of pressure relief seal 30. It should be appreciated, however, that the use of different stiffness values for spring 22 and spring 24 is possible and considered to be within the scope of the invention as claimed.

Figure 12:
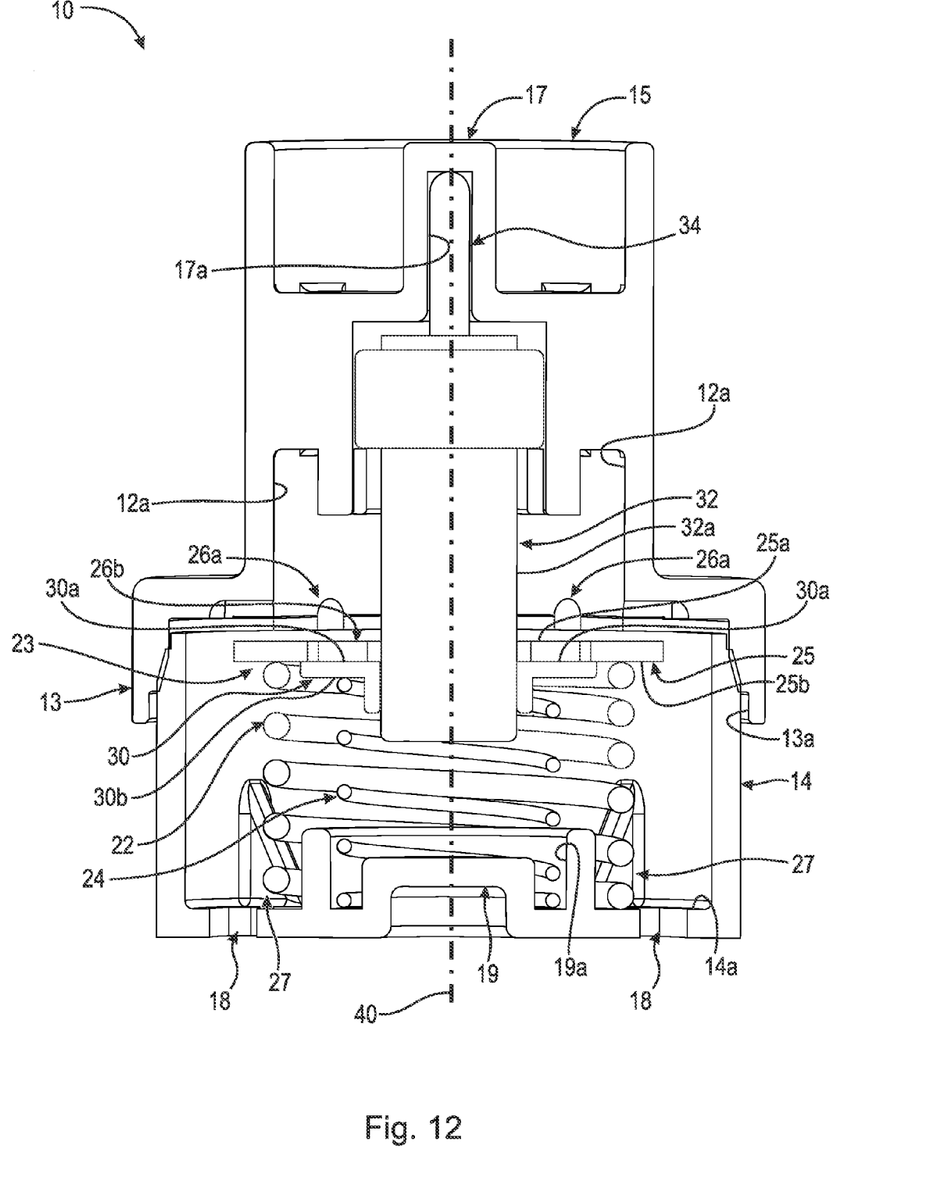
FIG. 12 is a cross-sectional view of thermal relief valve 10 in a second configuration taken generally along line 11-11 shown in FIG. 5; and, FIG. 13 is a cross-sectional view of thermal relief valve 10 in a third configuration taken generally along line 11-11 shown in FIG. 5.

FIG. 12 is a cross-sectional view of thermal relief valve 10 in a second configuration taken generally along line 11-11 shown in FIG. 5. As the temperature of fluid (not shown) flowing though thermal relief valve 10 increases, the expandable medium (not shown) will expand, forcing pin 34 to be linearly displaced along centerline 40 and to engage surface 17a of cylindrical enclosure 17 via surface 34a. When pin 34 is linearly displaced, thermal relief seal 25 and pressure relief seal 30 are also linearly displaced causing upwardly facing surface 25a of thermal relief seal 25 to separate from surface 12a of first housing component 12 allowing fluid (not shown) to flow though thermal relief seal 10 at a greater volumetric flow rate. It is important to note that upwardly facing surface 30a of pressure relief seal 30 remains engaged with downwardly facing surface 25b of thermal relief seal 25 when thermal actuator 32 axially displaces thermal relief seal 25 and thermal relief seal 30.

Figure 13:
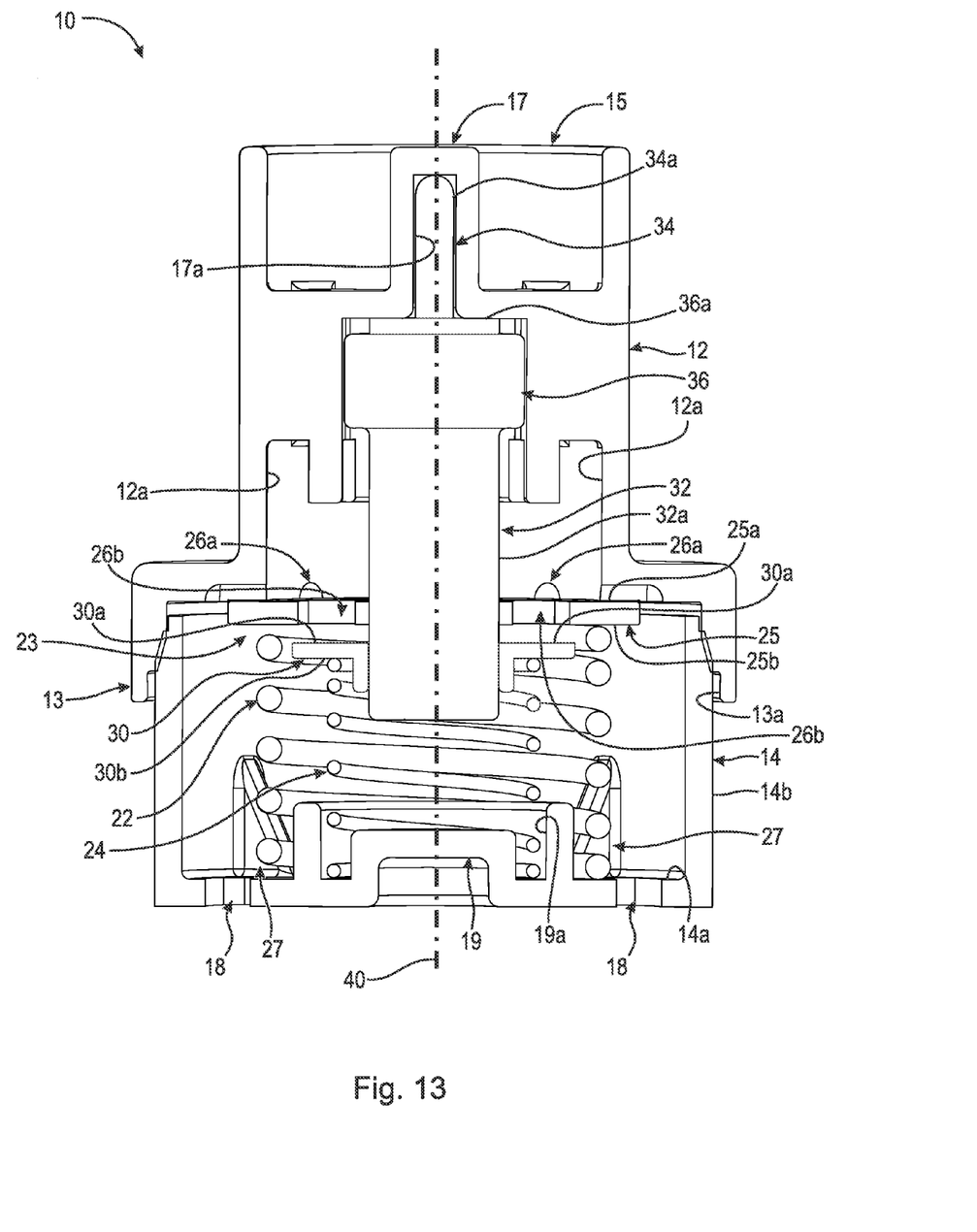

FIG. 13 is a cross-sectional view of thermal relief valve 10 in a third configuration taken generally along line 11-11 shown in FIG. 5. Pressure relief apertures 26b allow fluid (not shown) to apply pressure to pressure relief seal 30 if there is a pressure build-up in the system. If the pressure applied to pressure relief seal 30 through pressure relief apertures 26b reaches a certain amount, upwardly facing surface 30a of pressure relief seal 30 would separate from downwardly facing surface 25b of thermal relief seal 25 and allow fluid to flow through thermal relief valve 10 at a greater volumetric flow rate. It is important to note that thermal relief seal 25 can be axially displaced any length along centerline 40 when pressure relief seal 30 is forced open due to pressure from the fluid (not shown) since thermal relief seal 25 is axially displaced as a function of temperature while pressure relief seal 30 is axially displaced as a function of temperature due to downwardly facing surface 25b of thermal relief seal 25 engaging with upwardly facing surface 30a and a function of pressure being applied to upwardly facing surface 30a of pressure relief seal 30.

It will be appreciated that various aspects of the above-disclosed invention and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS 10 thermal relief valve
12 first housing component
13 cap
13a surface
14 second housing component
14a surface
14b surface
15 aperture
16a channel
16b guides
17 cylindrical enclosure
17a surface
18 apertures
19 channel
19a surface
22 spring
23 seal assembly
24 spring
25 thermal relief seal
25a upwardly facing surface
25b downwardly facing surface
26a channels
26b apertures
27 support
30 pressure relief seal
30a upwardly facing surface
30b downwardly facing surface
32 body
32a surface
34 pin
34a surface
36 thermal actuator
36a surface
40 centerline

What is claimed is:

1. A thermal relief valve, comprising:
a housing comprising at least one channel, a first aperture, and a second aperture, wherein said first aperture and said second aperture are arranged symmetrically about a central axis;
an actuator within said housing arranged about said central axis housing;
a first seal secured to said actuator, said first seal comprising a plurality of apertures, and having a first upwardly facing surface, and a second downwardly facing surface;
a first spring arranged between said second surface of said first seal and said housing component;
a second seal comprising a first upwardly facing surface and a second downwardly facing surface, said first surface of said second seal positioned on said second surface of said first seal; and,
a second spring arranged between said second surface of said second seal and said housing, wherein said first seal and said second seal are axially movable by said actuator along said central axis.

2. The thermal relief valve as recited in claim 1, wherein said housing further comprises a first housing component and a second housing component.

3. The thermal relief valve as recited in claim 2, wherein said at least one channel is arranged on said first housing component.

4. The thermal relief valve as recited in claim 1, wherein said first seal and said second seal are washers.

5. The thermal relief valve as recited in claim 1, wherein said actuator is a thermal actuator further comprising a pin arranged within an expandable medium.

6. The thermal relief valve as recited in claim 4, wherein said expandable medium is wax.

7. The thermal relief valve as recited in claim 1, wherein said second spring is concentrically arranged within said first spring.

8. The thermal relief valve as recited in claim 1, wherein said plurality of apertures of said first seal allow a fluid to interact with said second seal.

9. The thermal relief valve as recited in claim 1, wherein said thermal relief valve comprises a first configuration when said first surface of said first seal engages said housing and said first surface of said second seal engages said second surface of said first seal.

10. The thermal relief valve as recited in claim 1, wherein said thermal relief valve comprises a second configuration when said actuator is axially displaced, said first surface of said first seal does not engage said housing, and said first surface of said second seal engages said second surface of said first seal.

11. The thermal relief valve as recited in claim 1, wherein said thermal relief valve comprises a third configuration when said first surface of said second seal does not engage with said second surface of said first seal.

12. A seal assembly of a thermal relief valve, said thermal relief valve comprising a housing, an actuator within said housing, a first spring arranged within said housing, and a second spring arranged within said housing, said seal assembly comprising:
a first seal secured to said actuator, said first seal comprising a plurality of is apertures, and having a first upwardly facing surface, and a second downwardly facing surface; and,
a second seal comprising a first upwardly facing surface and a second downwardly facing surface, said first surface of said second seal positioned on said second surface of said first seal, wherein said first spring biases said first seal along said second surface of said first seal and said second spring biases said second seal along said second surface of said second seal.

13. The seal assembly as recited in claim 12, wherein said housing further comprises guides to direct said actuator along said central axis.

14. The seal assembly as recited in claim 12, wherein said first seal is a washer axially displaced as a function of temperature.

15. The seal assembly as recited in claim 12, wherein said second seal is a washer axially displaced as a function of temperature and pressure.

16. The seal assembly as recited in claim 14, wherein said first seal is secured to said actuator via a press fit.

17. The seal assembly as recited in claim 15, wherein said second seal is axially arranged on said actuator.

18. A thermal relief valve, comprising:
   a housing comprising at least one channel, a first aperture, and a second aperture, wherein said first aperture and said second aperture are arranged symmetrically about a central axis;
   an actuator within said housing arranged about said central axis housing;
   a first seal secured to said actuator, said first seal comprising a plurality of apertures, and having a first upwardly facing surface, and a second downwardly facing surface;
   a first spring arranged between said second surface of said first seal and said housing component;
   a second seal comprising a first upwardly facing surface and a second downwardly facing surface, said first surface of said second seal positioned on said second surface of said first seal; and,
   a second spring arranged between said second surface of said second seal and said housing component, wherein when said thermal relief valve is in a first configuration said first surface of said first seal engages said housing and said first surface of second seal engages said second surface of said first seal, when said thermal relief valve is in a second configuration said actuator is axially displaced, said first surface of said first seal does not engage said housing, and said first surface of said second seal engages said second surface of said first seal, and when said thermal relief valve is in a third configuration said first surface of said second seal does not engage with said second surface of said first seal.

19. The thermal relief valve as recited in claim 18, wherein said first spring has a greater stiffness than said second spring.

20. The thermal relief valve as recited in claim 18, wherein said first seal linearly displaced independently from said second seal.

* * * * *